Aug. 17, 1926.

J. S. L. WHARTON, JR 1,596,472

WEIGHING METER

Filed Dec. 26, 1922    2 Sheets-Sheet 1

INVENTOR
Joseph S. L. Wharton Jr.
BY John E. Hubbell
ATTORNEY

Aug. 17, 1926.
J. S. L. WHARTON, JR
WEIGHING METER
Filed Dec. 26, 1922
1,596,472
2 Sheets-Sheet 2
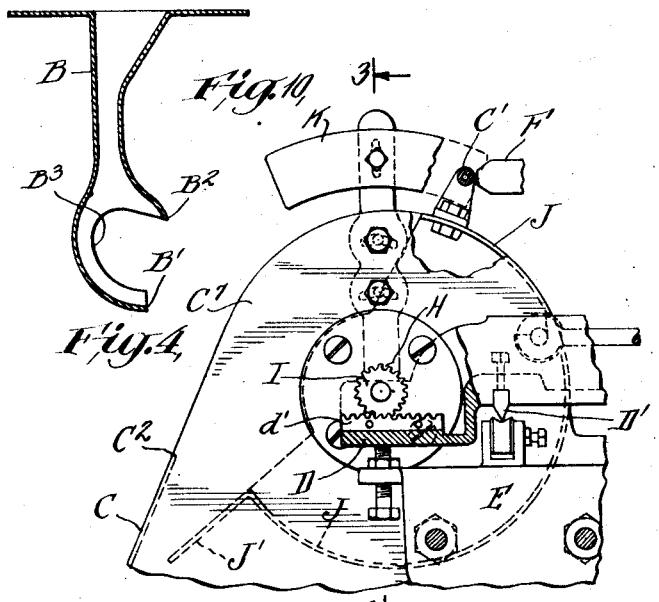
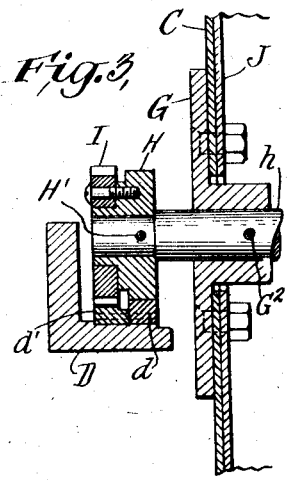
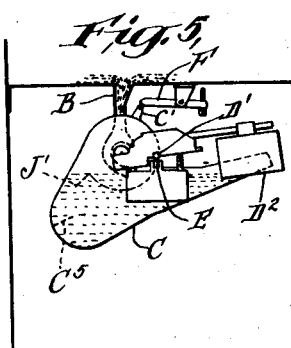
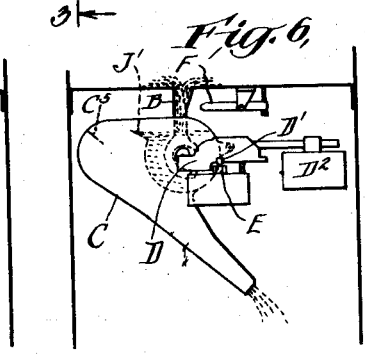
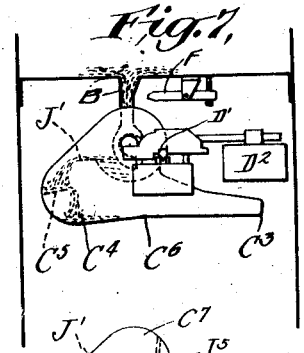
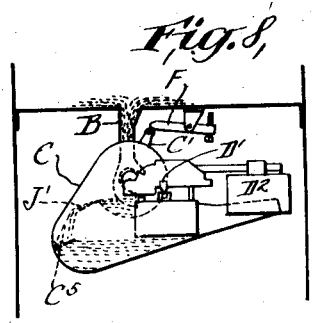
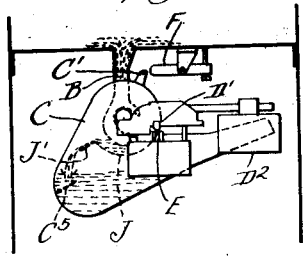
INVENTOR
Joseph S. L. Wharton Jr
BY John E. Hubbell
ATTORNEY Patented Aug. 17, 1926.

1,596,472

UNITED STATES PATENT OFFICE.

JOSEPH S. L. WHARTON, JR., OF MEADOWBROOK, PENNSYLVANIA, ASSIGNOR TO COCHRANE CORPORATION, OF PHILADELPHIA, PENNSYLVANIA, A CORPORATION OF PENNSYLVANIA.

WEIGHING METER.

Application filed December 26, 1922. Serial No. 608,916.

The general object of my present invention is to provide an improved form of weighing meter of the type in which liquid to be weighed is passed into a weighing bucket which, when it receives a given weight of liquid, tilts and discharges the liquid and then returns to its receiving position, the filling and discharging operations being alternately repeated as liquid is supplied to the apparatus.

More specifically, the primary object of my invention is to provide a construction whereby as the bucket alternately fills and discharges, the center of gravity will shift the bucket relative to the axis about which the bucket tilts in such manner as to insure definite and positive tilting movements both in the discharge and return directions without subjecting any portion of the apparatus to undesirable jar or shock. A further object of the invention is to provide an improved mounting for the tilting bucket. The invention comprises a bucket of novel shape, novel provisions for passing the liquid into the bucket, a novel bucket mounting, and special provisions for adjusting the center of gravity of the bucket.

The various features of novelty which characterize my invention are pointed out with particularity in the claims annexed to and forming a part of this specification. For a better understanding of the invention, however, and of its advantages and specific objects attained with it, reference should be had to the accompanying drawings and descriptive matter in which I have illustrated and described a preferred embodiment of my invention.

Of the drawings:

Fig. 3 is a section taken on the line 3—3 of Fig. 4;

Fig. 4 is a view taken similarly to Fig. 1, but on a larger scale, and showing a portion only of the apparatus shown in Fig. 1;

Figs. 5, 6, 7, 8 and 9 are diagrammatic elevations showing the bucket in different positions occupied by it in operation;

Fig. 10 is an end elevation of the spout through which liquid is supplied to the bucket; and Fig. 11 is an elevation in section of a portion of a bucket of modified construction.

Figure 1:
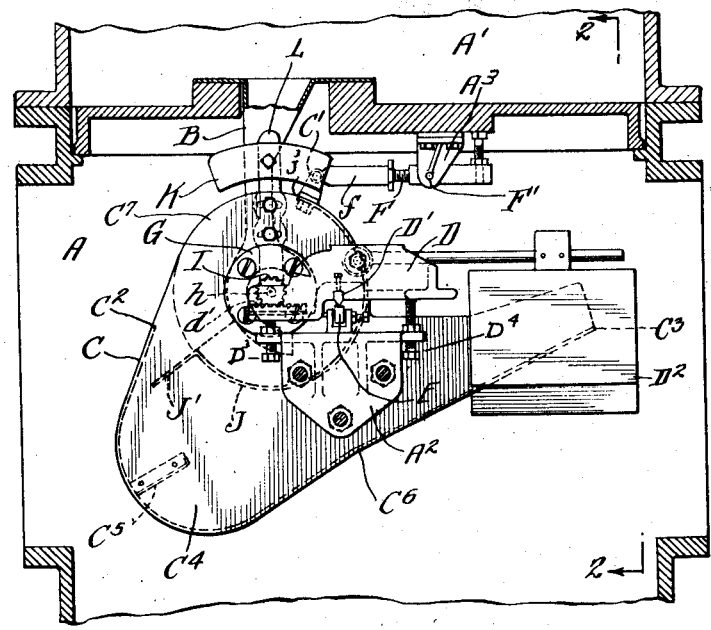
Fig. 1 is an elevation with parts broken away and in section.
Figure 2:
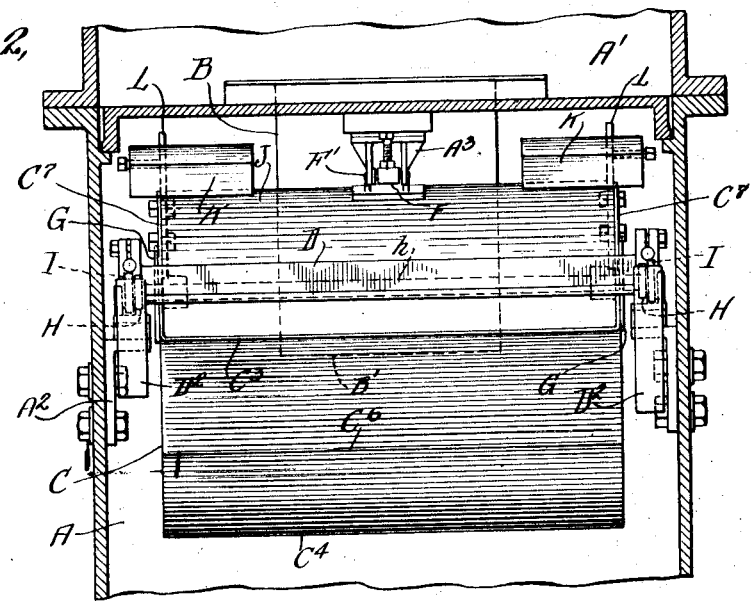
Fig. 2 is an elevation taken at right angles to Fig. 1 with parts broken away and in section.

In the forms of my invention illustrated in the drawings, the weighing mechanism proper is arranged in the compartment A of a casing, and the liquid to be weighed passes to the weighing mechanism through a spout B from a receiving compartment A'. The weighing mechanism proper, comprises a tilting bucket C which is mounted on a tilting frame of U shape which is provided with knife edge pivots D' resting on suitable bearing members or anvils E which are supported by brackets $A^2$ secured to the side walls of the compartment A. $D^3$ and $D^4$ are bolts mounted in the brackets $A^2$ and forming adjustable stops limiting the tilting movement of the frame D. As the bucket C fills up with liquid, it is prevented from tilting on the support D prior to the time when it receives the desired weight of liquid by means of a catch part in the form of a roller C' mounted on the bucket C and a latch member or locking dog F pivoted at F' in a bracket $A^3$ secured to the top wall of the compartment A. The latch or dog F comprises a cup shaped member $f$ which is threaded on the pivoted body of the latch and advantageously may have its closed end case hardened. The surface of the member $f$, which directly engages the roller stop C' normally lies in an approximately vertical plane. By rotating the part $f$ the effective length of the latch may be adjusted. When the proper weight of liquid has accumulated in the bucket C, the weight of the latter overbalances the weights $D^2$ carried by the frame D, and the latter turns in a counter clockwise direction about its pivotal axis to bring the roller C' below the end of the dog F, whereupon the bucket C tilts from the receiving position shown in Fig. 1, into the discharge position shown in Fig. 6 and empties, after which the bucket returns to its receiving position.

The bucket C may be described as trough or scoop shaped, $C^2$ representing one upper side edge of the trough, or back edge of the scoop, and $C^3$ representing the other upper side or discharge edge of the trough or scoop. The end or cheek pieces $C^7$ closing the ends of the trough or scoop, extend above the side edges C² and C³ of the trough when the latter is in its receiving position, and as shown have secured to them hub-like parts G. Mounted in the parts G is a shaft $h$ which is held against turning in the hub parts by pins G². Secured to the outer ends of the shaft $h$ by pins H', are rollers H which rest upon bearing parts carried one by each of the two legs of the frame D. To insure parallelism at all times between the axis of movement of the bucket C relative to the frame D, and the axis of movement of the frame D relative to the bearings E, a spur gear I is secured to the outer end of each roller H, with its teeth in mesh with a rack gear $d'$ carried by the frame D and connected, as shown, to the bearing parts $d$. The pitch circles of the gears I should be of the same diameter as the rollers H.

Mounted in, and forming a part of the bucket C is what I call a detainer J. The latter as shown in Figs. 1–9 comprises a body portion in the form of a segment of a hollow cylinder which is co-axial with the shaft $h$, and is secured at its ends to the end portions of the bucket proper. At one edge J' of the cylindrical body of the detainer J, the latter is formed with an outwardly extending lip or flange J'. The bucket C, and the detainer J may advantageously be formed out of sheet iron or steel, with the ends of the body portion of the bucket or scoop proper, and the ends of the detainer J welded to the bucket end or cheek pieces C⁷. The spout B extends into the detainer J through the space between its edges J' and J². The end walls of the spout B are notched as indicated at B³, to fit over the shaft $h$, and the side walls of the spout are shaped so that the lower edge B² of the front side wall, and the lower edge B' of the rear side walls of the spout are located well to the right hand side of the shaft H as seen in Fig. 1. In consequence liquid delivered by the spout B is always first received in the detainer J, and overflows from the latter into the bucket C proper.

The center of gravity of the bucket C may be adjusted by means of weights K carried by levers L secured to the end or cheek pieces of the bucket, provisions being made for adjusting the levers L with respect to the bucket angularly about the shaft $h$, and for adjusting the weights K longitudinally of the levers L.

In Figs. 1 and 4 the bucket is shown in the position which it occupies when containing nearly but not quite the entire amount of liquid which it is intended to receive before tilting and discharging. In this position of the apparatus the liquid extends toward the trough edge C³, to a distance to the right of the bucket axis appreciably greater than the distance to the left of the axis of any portion of the liquid in the bucket, and the center of gravity of the bucket and its contents is well to the right of the axis of the shaft $h$, and the roller stop C' bears against the end of the dog F. The parts remain in this position until the weight of the liquid held in the bucket is sufficient to tilt the frame D in the counter clockwise direction far enough to permit the stop C' to pass out of operative engagement with the dog F. The position of the apparatus at that instant is shown in Fig. 5. The bucket then tilts into the position shown in Fig. 6, discharging the liquid contents of the bucket over the discharge edge C³, after which the bucket returns to the position shown in Fig. 7, the bucket being balanced to swing into the last mentioned position when empty. While the bucket is turning from the position shown in Fig. 5 through that of Fig. 6 and into that shown in Fig. 7, liquid accumulates in the retainer F, and when the bucket is in the position shown in Fig. 7 this liquid overflows into the bucket C proper, and initially collects in the pocket-like portion C⁴ of the bucket which is located to the left of the portion of the bucket side extending between the line represented by the point C⁶ and the discharge edge C³. To prevent the liquid discharging into the bucket proper at this time from being carried by its momentum past the upper edge C⁶ of the pocket C⁴, a baffle C⁵ may advantageously be provided in the bucket as shown to receive and diminish velocity of the liquid discharged into the bucket from the retainer.

The liquid held in the bucket when the latter is in the position shown in Fig. 7, has its center of gravity well to the left of the axis of the shaft $h$. As the amount of liquid thus held increases, the center of gravity of the bucket shifts in a clockwise direction about the axis of the shaft $h$, and thereby causes the bucket to turn slowly and gradually in a counter clockwise direction through the position shown in Fig. 8, into that shown in Fig. 9. Movement in the counter clockwise direction beyond the position of Fig. 9 may be positively prevented in any suitable manner, as by the engagement of the upper edge J³ of the retarder J with the adjacent side of the spout B. In the position shown in Fig. 8, the roller stop C' is shown passing under the dog F which lifts to permit this. In the position shown in Fig. 9 the roller stop C' is appreciably to the left of the dog F. The apparatus may be designed and proportioned so that the bucket will turn into the position shown in Fig. 9 when something like two-thirds filled. As the liquid in the bucket C thereafter continues to increase, the center of gravity of the bucket gradually shifts back in a counter clockwise direction to the right of the axis of the shaft $h$, thus returning the bucket to the final filling position shown in Figs. 1 and 4, in which the roller C' engages the dog F. This occurs before the bucket receives its full charge, and when the latter is received, the center of gravity of the bucket is well to the right of the axis of the shaft $h$, so that when the roller C' passes under the dog F, the bucket swings by gravity into the discharging position.

It will be apparent to those skilled in the art that the apparatus shown possesses an important advantage over apparatus of a generally similar character heretofore known, in that the changes in the location of the center of gravity of the bucket and its contents as the bucket fills and empties, insures a positive discharge movement, and a positive return movement of the bucket from the position shown in Fig. 7 into that shown in Fig. 9, and in that the movement from the position of Fig. 7 into that of Fig. 9 and back into the position of Figs. 1 and 4 is a gradual movement, which does not subject the latching parts C' and F to shock or jar. The special form of pivotal mounting for the bucket C on the tilting frame D is practically frictionless, and avoids wear tending to disturb the accuracy and sensitiveness of the apparatus which has heretofore been a source of annoyance and trouble in apparatus of this character. The provisions for adjusting the bucket weights K both radially and angularly with respect to the bucket axis permit of a very sensitive and easily made adjustment of the center of gravity of the bucket, and of its inertia in the initial calibration of the meter, or to compensate for changes in operating conditions.

The circular curvature of the body of the retainer J about the bucket axis shown in Figs. 1–4, prevents the variable amounts of liquid held in the retainer in the different stages of operation from affecting the location of the center of gravity of the bucket and contents. In lieu of this the retainer may be shaped as shown in Fig. 11 with the back wall $J^5$ of the retainer JA there shown so shaped that the liquid held in the retainer will tend to turn the bucket from the position shown in Fig. 6 to that shown in Fig. 7.

Ordinarily a connection is made from the bucket to a suitable counting train or register for recording the number of times the bucket fills and empties but as such parts may be of any usual and well known form for the purpose, I have not thought it necessary to illustrate such parts herein.

While in accordance with the provisions of the statutes I have illustrated and described the best forms of my invention now known to me, it will be apparent to those skilled in the art that changes may be made in the form of apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A liquid meter comprising a measuring bucket, mounted to turn about an axis between final filling and discharging positions and having its center of gravity so located that the bucket, when empty, will be gravity held out of its final filling position, and having its liquid holding space so disposed that as the bucket gradually fills with liquid, the center of gravity of the bucket and its contents will first shift about said axis gradually in one direction to return the bucket to its final filling position, and will then shift in the opposite direction about said axis to thereby give the bucket a tendency to move into the discharge position, and means responsive to the weight of the bucket and its contents preventing movement of the bucket from its final filling position into its discharging position when the bucket holds less than a predetermined weight of liquid.

2. A liquid meter comprising a measuring bucket mounted to turn about an axis back and forth between final filling and discharging positions and formed with a main liquid holding space and with a separate liquid detaining space into which liquid entering the meter is first received and from it overflows into said main space, and so shaped that its liquid holding capacity is increased as the bucket moves out of its final filling position toward its discharge position and the accumulation of liquid therein when its holding capacity is thus increased tends to move the bucket from its discharge position toward its final filling position.

3. A liquid meter comprising a measuring bucket mounted to turn about an axis back and forth between final filling and discharge positions, uprising arms secured to the ends of the bucket by bolt and slot connecting means permitting the adjustment of said arms angularly about the bucket axis, and calibrating weights supported by said arms, and provisions for connecting said weights to said arms with the weights at different distance from the bucket axis.

4. In a liquid meter comprising a measuring bucket adapted to turn about an axis back and forth between final filling and discharging positions, the improved bucket mounting comprising a supporting frame provided with a horizontally disposed bearing surface at each end of the bucket and rollers carried by the bucket at its ends which rest on said bearing surfaces.

5. A liquid meter comprising a measuring bucket adapted to turn about an axis back and forth between final filling and discharging positions, the improved bucket mounting comprising a supporting frame provided with a horizontally disposed bearing surface and a rack gear at each end of the bucket, and a roller and a spur gear at each end of the bucket secured to the latter, and respectively resting upon and in mesh with the corresponding bearing surface and rack gear.

Signed at Philadelphia in the county of Philadelphia and State of Pennsylvania this 6th day of December A. D. 1922.

JOSEPH S. L. WHARTON, Jr.